United States Patent [19]

Wehner et al.

[11] Patent Number: 5,177,135

[45] Date of Patent: Jan. 5, 1993

[54] BETA-KETO ESTERS AS STABILIZERS FOR CHLORINATED POLYMERS

[75] Inventors: Wolfgang Wehner, Zwingenberg; Hermann O. Wirth, Behsheim, both of Fed. Rep. of Germany

[73] Assignee: Ciba-Geigy Corporation, Ardsley, N.Y.

[21] Appl. No.: 621,497

[22] Filed: Dec. 3, 1990

[30] Foreign Application Priority Data

Dec. 11, 1989 [CH] Switzerland .................... 4439/89

[51] Int. Cl.$^5$ .................... C08K 5/10; C08K 5/04; C08K 5/09

[52] U.S. Cl. .................... 524/315; 524/316; 524/317; 524/395; 524/396; 524/399; 524/400

[58] Field of Search .............. 524/396, 400, 315, 316, 524/395, 399, 317

[56] References Cited

FOREIGN PATENT DOCUMENTS 058447 2/1982 European Pat. Off.
8274346 of 1982 Japan .
1099731 1/1968 United Kingdom .

OTHER PUBLICATIONS

European Polymer Journal vol. 25 No. 12 pp. 1245-1250 (1989).

*Primary Examiner*—Paul R. Michl
*Assistant Examiner*—Tae H. Yoon
*Attorney, Agent, or Firm*—JoAnn Villamizar; William A. Teoli, Jr.

[57] ABSTRACT

A composition comprising
a) a chlorinated polymer,
b) at least one Me(II) carboxylate and/or Me(II) phenolate and/or Me(II) alkylphenolate, wherein Me(II) is Ba, Ca, Mg, Cd, Sr or Zn, and
c) at least one compound of formula (I)

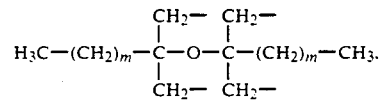

wherein n is 1, 2, 3, 4 or 6 and, when n=1, R is phenyl and X is an alkyl group of 10 to 20 carbon atoms, when n=2, R is alkyl of 1 to 4 carbon atoms or phenyl, and X is alkylene of 4 to 12 carbon atoms, alkylene of 2 to 12 carbon atoms which is substituted by at least one $C_1$-$C_8$alkyl group, or is $-CH_2-CH_2-S-CH_2-CH_2-S-CH_2-CH_2-$ or $-CH_2-CH_2-S-CH_2-CH_2-$, when n=3, R is alkyl of 1 to 4 carbon atoms of phenyl and X is $CH_3CH_2C(CH_2-)_3$, when n=4, R is alkyl of 1 to 4 carbon atoms or phenyl and X is a group

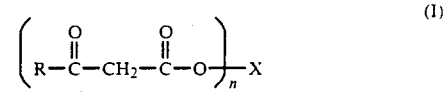

wherein m is 0 or 1, and, when n=6, R is alkyl of 1 to 4 carbon atoms or phenyl and X is the group

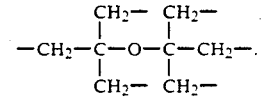

9 Claims, No Drawings

BETA-KETO ESTERS AS STABILIZERS FOR CHLORINATED POLYMERS

The present invention relates to the use of β-keto esters for stabilising chlorinated polymers against thermal degradation, and to the stabilised chlorinated polymers so obtained.

It is common knowledge that chlorinated polymers must be protected against the harmful effects of light and heat, especially when said polymers are processed to moulded articles. A number of β-keto esters and the use thereof as costabilisers are disclosed, for example, in EP-A 0 058 447, in GB-A-1 099 731 or in JP-A-82/74 346.

The present invention relates to compositions comprising
a) a chlorinated polymer,
b) at last one Me(II) carboxylate and/or Me(II) phenolate and/or Me(II) alkylphenolate, wherein Me(II) is Ba, Ca, Mg, Cd, Sr or Zn, and
c) at least one compound of formula (I)

$$\left( R-\overset{O}{\underset{\|}{C}}-CH_2-\overset{O}{\underset{\|}{C}}-O \right)_n X \tag{I}$$

wherein n is 1, 2, 3, 4 or 6 and, when n=1, R is phenyl and X is an alkyl group of 10 to 20 carbon atoms, when n=2, R is alkyl of 1 to 4 carbon atoms or phenyl, and X is alkylene of 4 to 12 carbon atoms, alkylene of 2 to 12 carbon atoms which is substituted by at least one $C_1$-$C_8$alkyl group, or is —CH$_2$—CH$_2$—S—CH$_2$—CH$_2$—S—CH$_2$—CH$_2$— or —CH$_2$—CH$_2$—S—CH$_2$—CH$_2$—, when n=3, R is alkyl of 1 to 4 carbon atoms or phenyl and X is CH$_3$CH$_2$C(CH$_2$—)$_3$, when n=4, R is alkyl of 1 to 4 carbon atoms or phenyl and X is a group

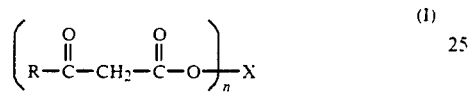

wherein m is 0 or 1, and, when n=6, R is alkyl of 1 to 4 carbon atoms or phenyl and X is the group

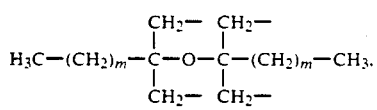

R as alkyl of 1 to 4 carbon atoms may be e.g. methyl, ethyl, propyl or butyl.

X as alkyl of 10 to 20 carbon atoms may be straight chain or branched and is, typically, n-decyl, n-dodecyl or n-octadecyl.

X as $C_4$-$C_{12}$alkylene or as $C_2$-$C_{12}$alkylene which is substituted by at least one $C_1$-$C_8$alkyl group may be e.g. 1,2-di-tert-butyldimethylene, tetramethylene, hexamethylene, 2,2-dimethyltrimethylene, 2-ethyl-2-butyltrimethylene, 2-methyl-2-propyltrimethylene, octamethylene, nonamethylene, decamethylene or dodecamethylene.

The variable n is preferably 1, 2 or 3.

Useful compositions of the type described above are those which contain at least one compound of formula I, wherein n is 1, and X is an alkyl group of 12 to 18 carbon atoms, preferably of 15 to 18 carbon atoms.

Useful compositions of the type described above are also those which contain at least one compound of formula I, wherein n is 2 and R is a CH$_3$ group or phenyl.

Yet further useful compositions of the type described above are those which contain at least one compound of formula I, wherein n is 2 and X is alkylene of 4 to 8 carbon atoms or alkylene of 2 to 8 carbon atoms which is substituted by one to three alkyl groups of 1 to 4 carbon atoms, or, in particular, those wherein X is alkylene of 4 to 6 carbon atoms or alkylene of 2 to 6 carbon atoms which is substituted by one or two alkyl groups of 1 to 4 carbon atoms, or wherein X is alkylene of 4 carbon atoms or alkylene of 2 or 3 carbon atoms which is substituted by one or two alkyl groups of 1 to 4 carbon atoms.

Preferred compositions of the type described above are those which contain at least one compound of formula I, wherein n is 2 and X is

—(CH$_2$)$_4$—,

—(CH$_2$)$_6$—,

—(CH$_2$)$_2$—S—(CH$_2$)$_2$—S—(CH$_2$)$_2$— or

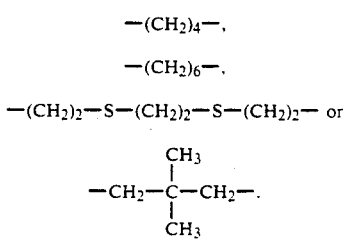

Further preferred compositions of the type described above are those which contain at least one compound of formula I, wherein n is 1, 2 or 3 and, when n is 1, R is phenyl and X is an alkyl group of 12 to 18 carbon atoms, when n is 2, R is methyl or phenyl and X is alkylene of 4 to 8 carbon atoms, (CH$_3$)$_2$C—(—CH$_2$—)$_2$, —CH$_2$—CH$_2$—S—CH$_2$—CH$_2$—S—CH$_2$—(—CH$_2$— or —CH$_2$—CH$_2$—S—CH$_2$—CH$_2$— and, when n=3, R is methyl or phenyl and X is CH$_3$CH$_2$—C—CH$_2$—)$_3$.

Component b) is preferably a Me(II) carboxylate, in which Me(II) is Ba, Ca, Mg, Cd or Zn and, is preferably Ca, Ba or Zn. The carboxylates are preferably salts of carboxylic acids containing 7 to 20 carbon atoms, for example benzoates, alkanoates or alkenoates, preferably stearates, oleates, laurates, palmitates, hydroxystearates or 2-ethylhexanoates. Octoates, stearates, caprylates, oleates or p-tert-butylbenzoates are especially preferred. The carboxylates may also be basic salts.

Mixtures of barium/zinc or calcium/zinc carboxylates are also especially preferred as component b), calcium/zinc being most preferred.

Calcium and/or zinc stearate, as well as basic zinc octoate or basic zinc caprylate, are also particularly preferred as component b).

If component b) is a Me(II) alkyl phenolate, then it is preferably a $C_7$-$C_{20}$alkyl phenolate such as nonyl phenolate.

In a further preferred embodiment of the invention, the novel compositions may contain an epoxy compound and/or a phosphite as additional component d).

The epoxy compound is preferably an epoxidised oil or an epoxidised fatty acid ester, for example epoxidised soybean oil, epoxidised butyl oleate or epoxidised octyl oleate.

The phosphites are preferably those of formulae

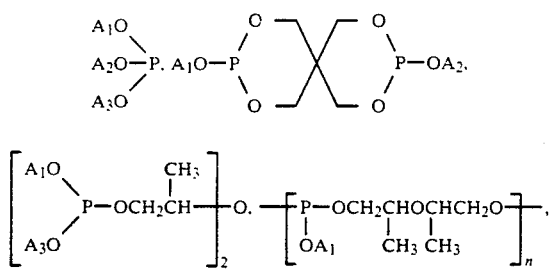

wherein $A_1$, $A_2$ and $A_3$ are each independently of one another $C_1$–$C_{18}$alkyl, $C_6$–$C_{18}$alkenyl, $C_5$–$C_7$cycloalkyl, phenyl or phenyl which is substituted by one to three $C_1$–$C_{12}$alkyl groups.

Exemplary of such phosphites are trioctyl, tridecyl, tridodecyl, tritetradecyl, tristearyl, trioleyl, triphenyl, tricresyl, tris-p-nonylphenyl and tricyclohexyl phosphite. Preferred phosphites are aryl dialkyl phosphites as well as alkyl diaryl phosphites such as phenyldidecyl, (2,4-di-tert-butylphenyl)didodecyl, (2,6-di-tert-butylphenyl)didodecyl phosphites and dialkyl and diaryl pentaerythrityl diphosphites such as distearyl pentaerythrityl diphosphite. Also preferred are tetraphenyl- and tetraalkyl[dipropylene glycol-1,2]-diphosphites and poly[dipropylene glycol-1,2-phenylphosphites] as well as poly[dipropylene glycol-1,2-alkylphosphites].

Especially preferred organic phosphites are distearyl pentaerythrityl diphosphite, tris(nonylphenyl) phosphite, phenyl didecyl phosphite, tetraphenyl[dipropylene glycol-1,2]-diphosphite and poly[dipropylene glycol-1,2-phenylphosphite].

The material to be stabilised can contain the Me(II) carboxylates or phenolates in a concentration which is known to the skilled person, typically in an amount of 0.05 to 5% by weight.

The phosphites are added in concentrations of, typically, 0.3 to 5% by weight, preferably 0.5 to 1% by weight, and the epoxy compound, for example the epoxidised soybean oil, is conveniently added in a concentration of 1 to 8% by weight, preferably 1 to 3% by weight.

The compounds of formula I are incorporated into the chlorinated polymer in amounts of, typically, 0.05 to 5% by weight, preferably 0.05 to 1% by weight, in particular 0.1 to 0.7% by weight.

The percentages are in each case based on the weight of the material to be stabilised.

The chlorinated polymers are preferably homopolymers or copolymers of vinyl chloride. Exemplary of suitable comonomers for the copolymers are: vinyl acetate, vinylidene chloride, transdichloroethene, ethylene, propylene, butylene, maleic acid, acrylic acid, fumaric acid, and itaconic acid. Suitable chlorinated polymers are postchlorinated PVC and chlorinated polyolefins, and also graft polymers of PVC with EVA, ABS and MBS. Preferred substrates are also mixtures of the above mentioned homo- and copolymers, preferably vinyl chloride homopolymers, with other thermoplastic and/or elastomeric polymers, especially with ABS, MBS, NBR, SAN and EVA.

Preferred polymers are also suspension and mass polymers as well as emulsion polymers.

Polyvinyl chloride is the particularly preferred chlorinated polymer.

Depending on the end use of the polymers, further additives can also be incorporated before or during the incorporation of the stabilisers. Such additives are, typically, phenolic antioxidants, lubricants (preferably montan waxes or glycerol esters, fatty acid esters, paraffins, amide waxes, stearic acid, mono- and dihydroxystearic acid, higher fatty alcohols), plasticisers, fillers, carbon black, asbestos, kaolin, talcum, glass fibres, modifiers (such as impact strength additives), processing auxiliaries (for example polymethacrylates), fluorescent whitening agents, pigments, light stabilisers, UV absorbers, flame retardants or antistatic agents.

Example of suitable organic plasticisers are those selected from the following groups:

A) Phthalates (phthalic acid esters)

Exemplary of such plasticisers are: dimethyl phthalate, diethyl phthalate, dibutyl phthalate, dihexyl phthalate, bis(2-ethylhexyl)phthalate, bis(n-octyl)phthalate, bis(isooctyl)phthalate, bis(isononyl)phthalate, bis(isodecyl)phthalate, bis(isotridecyl)phthalate, bis(cyclohexyl)phthalate, dimethylcyclohexyl phthalate, dimethyl glycol phthalate, dibutyl glycol phthalate, benzylbutyl phthalate and diphenyl phthalate, as well as mixtures of phthalates such as $C_7$–$C_9$alkyl phthalates and $C_9$–$C_{11}$alkyl phthalates from mainly linear alcohols, $C_6$–$C_{10}$n-alkyl phthalates and $C_8$–$C_{10}$n-alkyl phthalates. Preferred phthalates are dibutyl phthalate, dihexyl phthalate, bis(2-ethylhexyl)phthalate, bis(n-octyl)phthalate, bis(isooctyl)phthalate, bis(isononyl)phthalate, bis(isodecyl)-phthalate, bis(isotridecyl)phthalate and benzylbutyl phthalate, as well as the cited mixtures of alkylphthalates. Bis(2-ethylhexyl)phthalate (DOP) is especially preferred.

B) Esters of aliphatic dicarboxylic acids, in particular esters of adipic, azelaic and sebacic acid Exemplary of such plasticisers are: bis(2-ethylhexyl) adipate, bis(isooctyl) adipate (mixture), bis(isononyl) adipate (mixture), bis(isodecyl) adipate (mixture), benzylbutyl adipate, benzyloctyl adipate, bis(2-ethylhexyl) azelate, bis(2-ethylhexyl) sebacate and bis(isodecyl) sebacate (mixture). Bis(2-ethylhexyl) adipate and bis(isooctyl) adipate are preferred.

C) Trimellitates

Exemplary are: tris(2-ethylhexyl) trimellitate, tris(isodecyl) trimellitate (mixture), tris(isotridecyl) trimellitate, tris(isooctyl) trimellitate (mixture), as well as tris($C_6$–$C_8$-alkyl)trimellitate, tris($C_6$–$C_{10}$alkyl)trimellitate, tris($C_7$–$C_9$alkyl)trimellitate and tris($C_9$–$C_{11}$alkyl)-trimellitate. The last mentioned trimellitates are formed by esterification of trimellitic acid with the appropriate alkanol mixtures. Preferred trimellitates are tris(2-ethylhexyl) trimellitate and the cited trimellitates from mixtures of alkanols.

D) Polymer plasticisers

A definition of these plasticisers and examples thereof will be found in "Plastics Additives Handbook", edited by H. Gächter and H. Müller, Hanser Publishers, 1985, page 284, Chapter 5.7.10, and in "PVC Technology", edited by W. V. Titow, 4th Ed., Elsevier Publishing Co., 1984, pp. 165–170. The commonest starting materials for the preparation of the plasticisers are: dicarboxylic acids such as adipic acid, phthalic acid, azelaic acid, and sebacic acid; diols such as 1,2-propanediol, 1,3-butanediol, 1,4-butanediol, 1,6-hexanediol, neopentyl glycol and diethylene glycol; monocarboxylic acids such as acetic acid, capric acid, caprylic acid, lauric acid, myristic acid, palmitic acid, stearic acid, pelargonic acid and benzoic acid; monofunctional alcohols such as isooctanol, 2-ethylhexanol, isodecanol and mixtures of $C_7$-$C_9$alkanols and mixtures of $C_9$-$C_{11}$alkanols. Particularly useful polyester plasticisers are those obtained from the cited dicarboxylic acids and monofunctional alcohols.

E) Phosphates

A definition of these esters will be found in the "Plastics Additives Handbook" referred to above on page 271, Chapter 5.7.2. Examples of such phosphates are: tributyl phosphate, tris(2-ethylbutyl) phosphate, tris(2-ethylhexyl) phosphate, trichloroethyl phosphate, 2-ethylhexyl diphenyl phosphate, cresyl diphenyl phosphate, triphenyl phosphate, tricresyl phosphate and trixylenyl phosphate. The preferred phosphate is tris(2-ethylhexyl) phosphate.

F) Chlorinated hydrocarbons (paraffins).

G) Hydrocarbons.

H) Monoesters, for example butyl oleate, phenoxyethyl oleate, tetrahydrofurfuryl oleate and alkylsulfonates.

I) Glycol esters, for example diglycol benzoates.

Definitions and examples of plasticisers of groups F) to I) will be found in the following handbooks:

"Plastics Additives Handbook", edited by H. Gächter and H. Müller, Hanser Publishers, 1985, page 284, Chapter 5.7.11 (group F), and Chapter 5.7.13 (group G);

"PVC Technology", edited by W. V. Titow, 4th Ed., Elsevier Publishing Co., 1984, pp. 171-173, Chapter 6.10.2 (group F), page 174, Chapter 6.0.5 (group G), page 173, Chapter 6.10.3 (group H) and pages 173-174, Chapter 6.10.4 (group I).

Particularly preferred plasticisers are those of groups A) to E), especially those of groups A) to C) and, first and foremost, the plasticisers of these groups singled out as preferred. Bis(2-ethylhexyl)phthalate (DOP) is especially preferred.

The plasticisers are used in an amount of typically 15 to 70% by weight, preferably 15 to 60% by weight and, most preferably, 20 to 50% by weight, based on 100 parts by weight of polymer composition.

Further possible additives are β-aminocrotonates such as the compounds disclosed in DE-A-804 442, DE-A-807 207 and JP-A-75/17 454; pyrroles, for example the compounds disclosed in EP-A-22 087; aminouracils, for example the compounds disclosed in EP-A-65 934; aminothiouracils, for example the compounds disclosed in EP-A-41 479; polyols, for example the compounds disclosed in DE-A-3 019 910; β-diketones, for example the compounds disclosed in DE-A-2 600 516; or also mixtures of β-diketones and hydrotalcites as disclosed, for example, in EP-A-63 180.

The incorporation of the stabiliser components into the chlorinated polymer is best effected in conventional manner on a two-roll mill in the temperature range from 150° C. and 200° C. A sufficiently homogeneous mixture is normally obtained within 5 to 15 minutes. The addition of the components can be made individually or together as a premix. A liquid premix has proved useful, i.e. processing is carried out in the presence of inert solvents and/or plasticisers.

The compounds c) of this invention have good solubility in stabiliser systems based on liquid metal soaps, for example in basic zinc caprylate, in basic zinc octoate and/or epoxidised fatty acid esters. This makes the compounds c) of this invention especially valuable.

The compounds of formula I are known or they can be prepared by methods analogous to known ones or by transesterifying a β-keto acid ester, for example the ethyl or methyl ester, with a suitable alcohol, for example if X is $C_{10}$-$C_{20}$alkyl, by esterifying a methyl or ethyl β-keto acid ester with a $C_{10}$-$C_{20}$alkanol or, in the case of acetic acid esters, by reaction of the corresponding alcohol or glycol with diketene.

The present invention further relates to the use of compounds of formula I as described hereinabove for stabilising chlorinated polymers which contain at least one Me(II) carboxylate and/or Me(II) phenolate, wherein Me(II) denotes Ba, Ca, Mg, Cd, Sr or Zn, against thermal degradation.

The following examples illustrate the invention in more detail. Parts and percentages are by weight, unless otherwise stated.

EXAMPLE 1

Stearyl benzoyl acetate

With stirring, 57.6 g (0.3 mol) of methyl benzoyl acetate and 81.2 g (0.3 mol) of stearyl alcohol are heated in a 250 ml three-necked flask to 160° C. After 6 hours, 9.5 ml (theory: 9.5 ml) of methanol have distilled off. The wax-like residue is recrystallised in petroleum ether/activated charcoal. The yield of stearyl benzoyl acetate is 79% of theory. Melting point: 57° C.

EXAMPLE 2

1,4-Butanediol bis(benzoyl) acetate 22.0 g (0.25 mol) of 1,4-butanediol and 192.0 g (1.0 mol) of ethyl benzyol acetate are heated in a 250 ml three-necked flask to 150°. After 3 hours, 23.0 g (theory: 23.0 g) of ethanol have distilled off. Then 96.1 g (theory: 96.6 g) of volatile constituents—mainly excess keto esters—are stripped off at $10^{-3}$ torr. The distilled residue (85.6 g) is digested with ether to give colourless crystals which melt at 75° C.

Yield: 46.1 g, corresponding to 48.2% of theory.

EXAMPLE 3

1,1,1-Trimethylolpropane tris(acetoacetate)

Preparation as in Example 2. Molar ratio of reactants (methyl acetoacetate/trimethylpropane) = 6:1, reaction time 11 h.

Yield: 93% of theory of a resinous substance; the $^1$H-NMR spectrum shows that 18 mol % of partial esters (mainly bis(acetoacetate)) is still present.

EXAMPLE 4

1,4-Butanediol bis(acetoacetate)

Preparation as in Example 2. Molar ratio of the reactants = 4:1, reaction time 1 hour.

Yield: 85% of theory (b.p.: 166°-170° C./<$10^{-3}$).

EXAMPLE 5

1,6-Hexanediol bis(acetoacetate)

Preparation as in Example 2. Molar ratio of the reactants = 4:1, reaction time 4 hours.

Yield: 77.4% of theory (b.p.: 173°-175° C./<$10^{-3}$).

EXAMPLE 6

Neopentyl glycol bis(acetoacetate)

Preparation as in Example 2. Molar ratio of the reactants = 4:1, reaction time 4 hours. Yield: 82.8% of theory (b.p.: 153°-156° C./<$10^{-3}$).

EXAMPLE 7

(—CH$_2$SC$_2$H$_4$O$_2$CCH$_2$COC$_6$H$_5$)$_2$

Preparation as in Example 2. Molar ratio of the reactants=4:1, reaction time 3 hours. Yield: 62.6% of theory (m.p.: 55° C.—from toluene/petroleum ether).

EXAMPLE 8

(—CH$_2$SC$_2$H$_4$O$_2$CCH$_2$COCH$_3$)$_2$

Preparation as in Example 2. Molar ratio of the reactants=4.6:1, reaction time 4 hours. Yield: 78.2% of theory (m.p.: 26° C.—from methanol).

EXAMPLE 9

S-(-C$_2$H$_4$O$_2$CCH$_2$COC$_6$H$_5$)$_2$

Preparation as in Example 2. Molar ratio of the reactants=4:1, reaction time 3 hours. Yield: quantitative (viscous oil; n$_D^{20}$=1.5749). (In Examples 4 to 9 the acetoacetate is always in excess).

EXAMPLE 10

A dry mix comprising
100.0 parts of an emulsion polymer having a K-value of 57 (polyvinyl chloride),
4.0 parts of epoxidised soybean oil,
0.39 part of calcium stearate,
0.15 part of zinc stearate,
0.1 part of polyethylene wax (external lubricant)
0.5 part of PVC processing aid based on polymethylmethacrylate,
8.0 parts of methyl butadiene/styrene impact modifier,
0.6 part of a mixture of fatty alcohols (C$_{16}$–C$_{18}$) and partially oxidised PE wax (internal lubricant)
0.3 part of diisodecylphenyl phosphite and
0.6 part of a co-stabiliser (compound c)) of this invention is rolled on a mixer roller for 5 minutes at 180° C. Samples of the 0.3 mm rough sheet so obtained are subjected to heat in a drying oven at 180° C. The Yellowness Index (YI) of the samples is determined at regular intervals in accordance with ASTM D 1925. The results are reported in Table 1.

TABLE 1

| Compound c) according to | YI values at 5 minute intervals minutes |
|---|---|

| Example | 0 | 5 | 10 | 15 | 20 | 25 | 30 | 35 | 40 |
|---|---|---|---|---|---|---|---|---|---|
| 2 | 6.3 | 7.9 | 9.3 | 10.6 | 13.1 | 18.8 | 32.5 | 78.9 | 98.1 |

EXAMPLE 11

A pressed sheet is prepared from the dry mix of Example 10, applying a pressure of 200·10$^5$ PA for 1 minute at 180° C. The pressed sheet has a Yellowness Index (YI) of 27.6 according to ASTM D 1925.

EXAMPLE 12

A dry mix comprising
100.0 parts of a suspension polymer having a K-value of 64 (polyvinyl chloride),
3.0 parts of epoxidised soybean oil,
0.35 part of calcium stearate,
0.15 part of zinc stearate,
0.55 part of didecylphenyl phosphite and
0.65 part of a co-stabiliser (compound c)) of this invention is rolled on a mixer roller for 5 minutes at 180° C. Samples of the 0.3 mm rough sheet so obtained are subjected to heat in a drying oven at 180° C. The Yellowness Index (YI) of the samples is determined at regular intervals in accordance with ASTM D 1925. The results are reported in Table 2.

TABLE 2

| Compound c) of Example | YI values at 5 minute intervals Minutes | | | | | | | |
|---|---|---|---|---|---|---|---|---|
| | 0 | 5 | 10 | 15 | 20 | 25 | 30 | 35 |
| (Comparison) none | 19.5 | 27.3 | 30.4 | 38.6 | 34.3 | 34.7 | 53.8 | 85.2 |
| 4 | 2.8 | 5.6 | 6.9 | 11.3 | 15.4 | 24.8 | 43.1 | 62.7 |

EXAMPLE 13

A pressed sheet is prepared from the dry mix of Example 12, applying a pressure of 200·10$^5$ PA for 1 minute at 180° C. The pressed sheet has a Yellowness Index (YI) of 16.0 according to ASTM D 1925.

EXAMPLE 14

A dry mix comprising
100.0 parts of a suspension polymer having a K-value of 70 (polyvinyl chloride),
17.0 parts of dioctyl phthalate,
3.0 parts of epoxidised soybean oil,
0.15 part of zinc stearate,
2.0 parts of liquid barium/zinc stabiliser and
0.2 part of co-stabiliser (compound c)) of this invention is rolled on a mixer roller for 5 minutes at 190° C. Samples of the 0.3 mm rough sheet so obtained are subjected to heat in a test oven ((R)Mathis-Thermotester) at 180° C. The Yellowness Index (YI) of a sample is determined at regular intervals in accordance with ASTM D 1925. The results are reported in Table 3.

TABLE 3

| Comp. c) of Ex. | YI values at 5 minute intervals Minutes | | | | | | | | | | | | | |
|---|---|---|---|---|---|---|---|---|---|---|---|---|---|---|
| | 0 | 5 | 10 | 15 | 20 | 25 | 30 | 35 | 40 | 45 | 50 | 55 | 60 | 65 |
| 4 | 5.2 | 6.9 | 8.9 | 10.9 | 19.8 | 15.9 | 17.5 | 18.4 | 18.1 | 18.4 | 18.2 | 17.9 | 17.9 | 19.1 |

EXAMPLE 15

A dry mix comprising
100.0 parts of polyvinyl chloride ((R)Solvic 264 GA),
3.0 parts of epoxidised soybean oil,
0.35 part of calcium stearate,
0.15 part of zinc stearate,
0.55 part of diisodecylphenyl phosphite and
0.3 part of co-stabiliser (compound c)) of this invention is rolled on a mixer roller for 5 minutes at 180° C. Samples of the 0.3 mm rough sheet so obtained are subjected to heat in a test oven (®Mathis-Thermotester) at 180° C. The Yellowness Index (YI) of a sample is determined at regular intervals in accordance with ASTM D 1925. The results are reported in Table 4.

TABLE 4

| Comp. c) of Ex. | YI values at 5 minute intervals Minutes | | |
|---|---|---|---|
| | 0 | 5 | 10 |
| none | 18.9 | 25.8 | 30.9 |
| 2 | 3.0 | 4.0 | 5.7 |
| 7 | 2.8 | 4.2 | 6.0 |

What is claimed is:

1. A composition comprising
a) a chlorinated polymer,
b) at least one Me(II) carboxylate and/or Me(II) phenolate and/or Me(II) alkylphenolate, wherein Me(II) is Ba, Ca, Mg, Cd, Sr or Zn, and
c) at least one compound of formula (I)

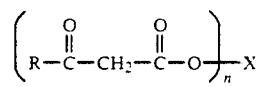

wherein n is 2, 3, 4 or 6 and, when n=2, R is alkyl of 1 to 4 carbon atoms or phenyl, and X is alkylene of 4 to 12 carbon atoms, alkylene of 2 to 12 carbon atoms which is substituted by at least one C$_1$-C$_8$ alkyl group, or is —CH$_2$—CH$_2$—S—CH$_2$—CH$_2$—S—CH$_2$—CH$_2$— or —CH$_2$—CH$_2$—S—CH$_2$—CH$_2$—, when n=3, R is alkyl of 1 to 4 carbon atoms or phenyl and X is CH$_3$CH$_2$C(CH$_2$—)$_3$, when n=4, R is alkyl of 1 to 4 carbon atoms or phenyl and X is a group

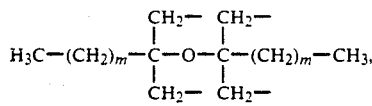

wherein m is 0 or 1, and, when n=6, R is alkyl of 1 to 4 carbon atoms or phenyl and X is the group

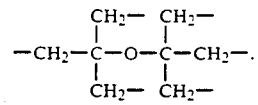

2. A composition according to claim 1 comprising at least one compound of formula I, wherein n is 2 or 3.
3. A composition according to claim 1 comprising at least one compound of formula I, wherein n is 2 and R is CH$_3$ or phenyl.
4. A composition according to claim 1 comprising at least one compound of formula I, wherein n is 2 and X is alkylene of 4 to 8 carbon atoms or alkylene of 2 to 8 carbon atoms which is substituted by one to three alkyl groups of 1 to 4 carbon atoms.
5. A composition according to claim 4 comprising at least one compound of formula I, wherein X is alkylene of 4 to 6 carbon atoms or alkylene of 2 to 6 carbon atoms which is substituted by one or two alkyl groups of 1 to 4 carbon atoms.
6. A composition according to claim 4 comprising at least one compound of formula I, wherein X is alkylene of 4 carbon atoms or alkylene of 2 or 3 carbon atoms which is substituted by one or two alkyl groups of 1 to 4 carbon atoms.
7. A composition according to claim 1 comprising at least one compound of formula I, wherein n is 2 and X is

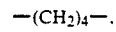
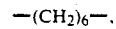
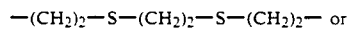 or
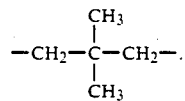

8. A composition according to claim 1 comprising at least one compound of formula I, wherein n is 2 or 3 and, when n is 2, R is methyl or phenyl and X is alkylene of 4 to 8 carbon atoms, (CH$_3$)$_2$C-(-CH2—)$_2$, —CH$_2$—CH$_2$—S—CH$_2$—CH$_2$—S—CH$_2$—CH$_2$— or —CH$_2$—CH$_2$—S—CH$_2$—CH$_2$— and, when n=3, R is methyl or phenyl and X is CH$_3$CH$_2$—C-(-CH$_2$—)$_3$.
9. A process for stabilising chlorinated polymers against thermal degradation, which comprises incorporating in said chlorinated polymers at least one Me(II) carboxylate and/or Me(II) phenolate and/or Me(II) alkylphenolate, wherein Me(II) is Ba, Ca, Mg, Cd, Sr or Zn, and at least one compound of formula I as defined in claim 1.

* * * * *